United States Patent [19]
Rudd

[11] 3,852,965
[45] Dec. 10, 1974

[54] FLOTATION TYPE WATER SWEEP BOOM AND METHODS

[76] Inventor: Chris H. Rudd, 824 Luton Dr., Glendale, Calif. 91206

[22] Filed: Oct. 31, 1973

[21] Appl. No.: 411,277

Related U.S. Application Data

[63] Continuation of Ser. No. 207,187, Dec. 13, 1971, abandoned.

[52] U.S. Cl. ................................... 61/1 F
[51] Int. Cl. ............................... E02b 15/04
[58] Field of Search..... 61/1 F, 5; 210/242, DIG. 21

[56] References Cited
UNITED STATES PATENTS

| | | | |
|---|---|---|---|
| 3,592,006 | 7/1971 | Crucet | 61/1 F |
| 3,612,280 | 10/1971 | Fitzgerald et al. | 210/242 |
| 3,648,463 | 3/1972 | Ayers | 61/1 F |
| 3,686,870 | 8/1972 | Blomberg | 61/1 F |

FOREIGN PATENTS OR APPLICATIONS
843,131    8/1960    Great Britain.................... 61/1 F Primary Examiner—Jordan Franklin
Assistant Examiner—David H. Corbin
Attorney, Agent, or Firm—Lyon and Lyon

[57] ABSTRACT

A floating boom apparatus adapted to collect floating material and elements, such as oil, in water by being towed laterally through the water from each end of the boom wherein a curtain extends downwardly in the water from a floating surface barrier with the upper portion of the curtain being impervious and the lower portion being open for the passage of water therethrough. The boom is towed by two lines, one extending through the floating surface barrier and the other connected along the lower extremity of the curtain, and the lower line is pulled in advance of the upper line.

20 Claims, 11 Drawing Figures

PATENTED DEC 10 1974

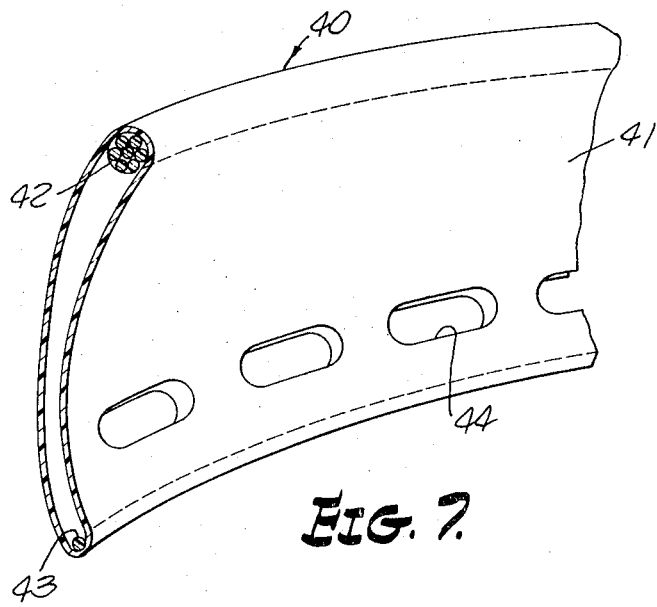
FIG. 7.
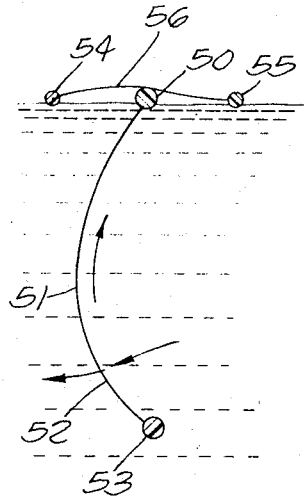
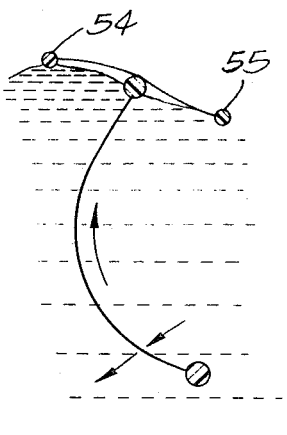
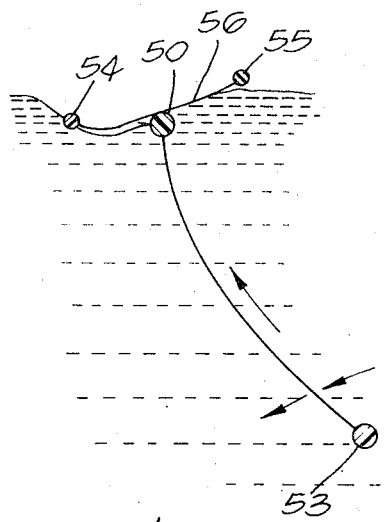
FIG. 8.   FIG. 9.   FIG. 10.
FIG. 2A.
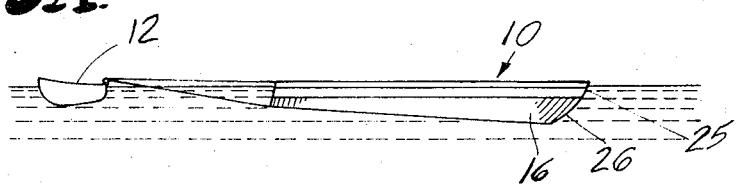

FLOTATION TYPE WATER SWEEP BOOM AND METHODS

This is a continuation of application Ser. No. 207,187, filed Dec. 13, 1971 now abandoned.

This invention relates to a floating boom type apparatus for sweeping floating elements from an area of water and in particular is directed to a boom that is capable of being towed through waves and choppy water and at higher rates of speed than heretofore possible.

The problem created by the natural or accidental spillage of oil or other floating material into bodies of water is well known. Numerous systems and arrangements have been developed, principally in recent years, for containing or collecting such spillage. One publication that describes a number of systems and apparatus that have been conceived or employed for this purpose is the government report entitled Oil Containment Systems, dated October 1970 distributed by the Federal Water Quality Administration of the U.S. Department of the Interior and prepared by the Oil and Hazardous Materials Research Section, Edison Water Quality Laboratory Edison, New Jersey which publication mentions or describes approximately 50 floating boom arrangements or proposals. As noted throughout that publication, all of the therein described floating booms have one or more deficiencies or limitations in their use.

While virtually any floating member may be used to sweep a small area of the surface of quiescent water, the problems in sweeping a large body of water or a water surface that is relatively choppy or wavy are entirely different and not easily overcome. As the area increases the likelihood of leakage of the contaminant over or under the boom is greatly increased and obviously the presence of choppy or wavy surface conditions complicates the matter. This situation is commonplace upon the occurrence of spillage in the ocean. Moreover wind and water current conditions in the ocean tend to spread and convey oil spillage rapidly whereby it is desirable to be able to contain and collect the spillage rapidly to minimize the area that must be swept.

In summary this invention provides a floating boom of a configuration that accommodates adverse water surface conditions and permits relatively rapid towing of the boom through the water.

An object of this invention is to provide a novel form of floating boom comprising a floating surface barrier with a depending curtain in which the lowermost portion of the curtain is open for the passage of water and below which is attached a tow line for pulling the lower portion of the curtain in advance of the floating barrier.

Another object of this invention is to provide a novel form of floating boom comprised of a floating element and a depending curtain wherein both the floating element and the lower extremity of the curtain are connected to tow lines and the angle of attack of the curtain may be varied by varying the relative tension on the two tow lines to produce the optimum results for the conditions involved. A further object is to provide such a floating boom wherein a portion of the curtain above the lower tow line is open for the passage of water therethrough which assists in stabilizing the movement of the curtain through the water.

Still another object of this invention is to provide a novel construction of a floating boom apparatus comprising any number of individual segments joined side-by-side with the tow lines extending therethrough in which each segment is an assembly of a flotation element and depending curtain. A more detailed object of this invention is to provide such a boom with the construction of the floating member being comprised of a sheet of bubble pack material in a roll of the desired size whereby a highly flexible, buoyant and damage resistant flotation member is provided. A still further object is to provide such a novel construction in which vertical straps may be provided for reinforcing the structure and connecting to the tow line for transmitting the towing force. The straps may conveniently be of varying lengths along the boom to accommodate the different dynamic conditions developed along the length of the boom as it is pulled through the water.

Other and more detailed objects and advantages of this invention will appear from the following description and the accompanying drawings wherein:

FIG. 2A is a view similar to FIG. 2 and illustrating the modified embodiment of the floating boom of this invention.

FIG. 7 is a perspective view of a modified form of the floating boom apparatus of this invention.

FIGS. 8, 9 and 10 are schematic elevation views of still another modified form of the floating boom apparatus of this invention and illustrating the response of such form to different water and towing conditions.

Figure 1:
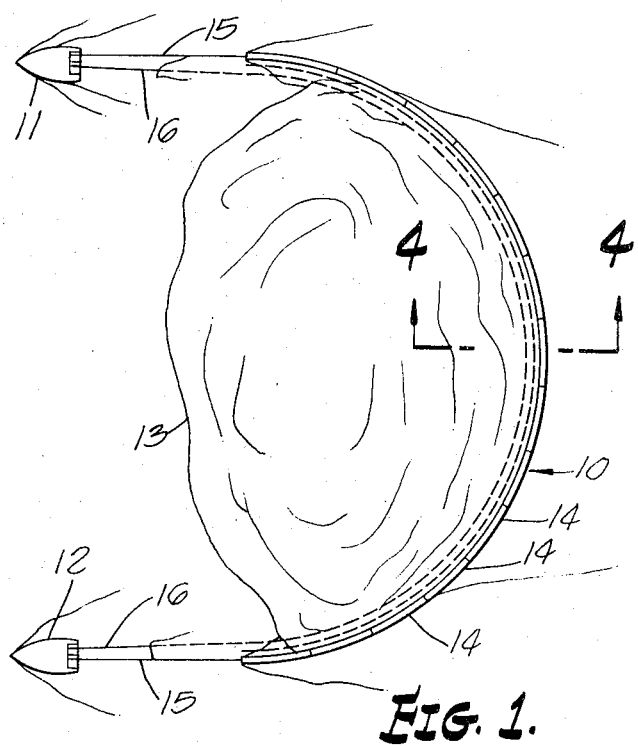
FIG. 1 is a schematic plan view of the floating boom of this invention being towed by two vessels.
Figure 2:
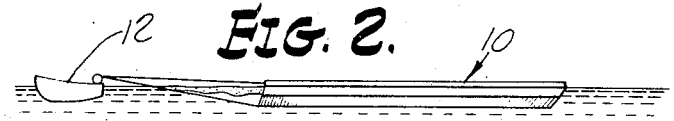
FIG. 2 is a schematic elevation view of the floating boom of this invention as it is towed.
Figure 3:
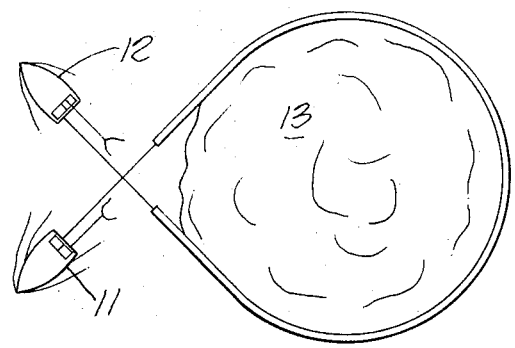
FIG. 3 is a schematic plan view illustrating the manner in which the floating boom of this invention may be closed to create a 360° barrier around a body of floating material that has been collected.

Referring now to FIGS. 1 and 2, the floating boom, generally designated 10, of this invention is adapted to be towed behind two vessels 11 and 12 in its normal manner of use although it will readily appear to those skilled in the art that the floating boom 10 may be used in any manner in which devices of this type are used. For example there are occasions when the spillage or pollution occurs in a river and it is desirable to contain and collect the floating material at some point along the river in which case the floating boom 10 may not be towed by vessels 11 and 12 but rather it may merely be connected to stationary points on either side of the river with the flowing water creating the curved attitude assumed by the boom 10. The floating material being collected by the boom 10 is illustrated in FIGS. 1 and 3 by the area 13.

The floating boom 10 of this invention is preferably comprised of individual curtain segments 14 of a horizontal length that may be conveniently handled and the segments 14 are joined together to form a boom of the desired length to accommodate the spillage condition involved. In the preferred arrangement the segments 14 are connected by two tow lines, an upper tow line 15 and a lower tow line 16 which in turn are connected to the vessels 11 and 12. As will appear more fully hereinafter, the relative tensions on the tow lines 15 and 16 may vary and each line also serves the function of joining the individual curtain segments 14. In addition, any convenient means may be used to form a seam between adjacent edges of the curtain segments 14.

Figure 5:
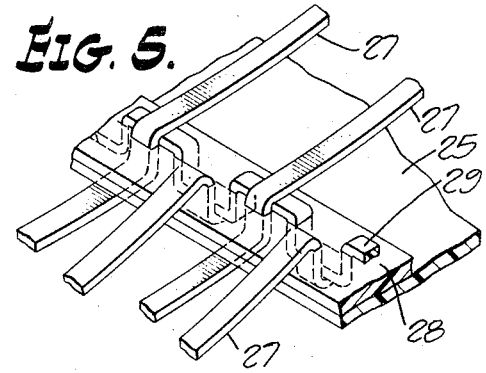
FIG. 5 is a fragmentary perspective view of the portion of the floating boom of FIG. 4 at the juncture of the impervious and open portions of the curtain.
Figure 4:
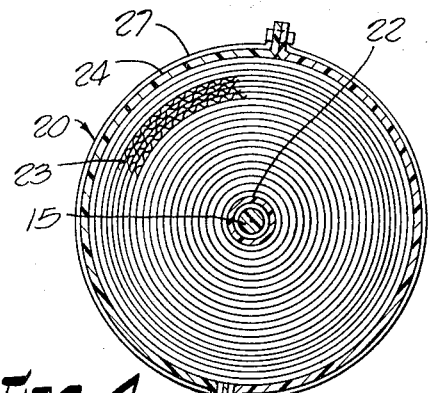
FIG. 4 is an enlarged sectional elevation taken on the line 4—4 in FIG. 1 and illustrating the preferred form of construction of the floating boom of this invention.
Figure 6:
FIG. 6 is a fragmentary perspective view of the lowermost portion of the floating boom of FIG. 4 illustrating one manner of connecting the vertical straps of the curtain to the lowermost tow line.

Referring now to FIGS. 4, 5 and 6, means are provided for comprising the floating boom 10 of this invention and as illustrated, these means include a flotation member 20 and a depending curtain member 21. The flotation member 20 may be of any convenient construction but the preferred construction comprises a central tube 22 around which is wrapped a continuous web of successive layers of bubble pack sheet material 23 until the desired size and buoyancy of flotation member 20 is reached. The bubble pack sheet material 23 is widely used at present as a packing material and comprises a pair of sheets of plastic material with individual air bubbles formed therebetween and the sheets sealed together in the area between air bubbles. At present this is believed to be the most desirable material for construction of the flotation member 20 in that the sheet material 23 is highly flexible and impact resistant for withstanding the conditions occurring in using and handling of this apparatus. Moreover the buoyancy of the sheet material 23 is effected only by individual puncturing of the bubbles and therefore any localized impact to or puncture of the floating member 20 will have only a small effect on the overall buoyancy of the member. The central tube 22 is of appropriate diameter to pass the upper tow line 15 therethrough and may be of any convenient material such as polyvinylchloride. The exterior cover 24 of the floating member 20 is comprised of a tube or sheet of material such as polyethylene that will resist abrasion, weathering and the chemical elements likely to be encountered in the use of the apparatus. As shown in FIG. 4, for convenience of assembly the cover 24 is comprised of two longitudinally extending sheets seamed along the top and bottom of the member in the manner hereinafter described.

The depending curtain 21 comprises an impervious upper skirt portion 25 and an open lower portion 26 with the lower tow line 16 connected along the lower extremity of the curtain. The vertical length of the curtain 21 and particularly the skirt portion 25 will depend on the environment in which the floating boom 10 is to be used. It is contemplated that the skirt portion 25 will extend downwardly at least 4 feet for a boom 10 that will be used in the ocean while obviously a boom 10 that is intended for use solely in a quiet harbor may have a substantially shorter skirt portion 25 and smaller float member 20. The skirt 25 may be of any convenient material such as the same material comprising the cover 24.

In this preferred construction of the floating boom 10 as illustrated in FIGS. 4, 5 and 6, the structural integrity and strength of the float member 20 and curtain 21 are enhanced by using vertically extending straps 27 horizontally spaced along the length of the boom. The straps 27 preferably extend around the circumference of the float member 20 and down each side of the skirt 25. At the lower extremity of the skirt 25, as illustrated in FIG. 5, a horizontal strap or plate 28 is provided and the straps 27 pass through apertures in the plate 28 and skirt 25. It is preferred that every other strap 27 be positioned on one side of the skirt 25 to thereby reinforce both sides of the skirt. Another strap 29 is stitched along the plate 28 locking the plate to the skirt and may either overlap the vertical straps 27 to secure them in place or underlie them to allow the straps 27 to slip through the plate. The straps 27 and 29 may be of any convenient material such as woven nylon which provides substantial strength, resistance to the elements, and is lightweight. It is preferred that the plate 28 be somewhat flexible such as ⅛ inch or ¼ inch polyethylene sheet. For further protection of the lower edge of skirt 25 it may be desirable to provide a plate 28 on each side of the skirt and bond same to the skirt in any convenient manner. The plate 28 also serves as a convenient element to which ballast may be connected as desired to effect the position or attitude the skirt 25 will assume during use of the boom. A similar form of reinforcing and interlocking employing a longitudinal plate may be used on the seams of the cover 24.

The vertical straps 27 continue downwardly from the plate 28 in the form of a harness to connect to the tow line 16 and the straps comprise the lower open portion 26 of the curtain 21. Any convenient means may be used to attach the straps 27 to tow line 16 and if it is preferred that continuous strapping 27 be used along the length of the curtain segment it is possible to merely wrap the strap 27 around the tow line 16 as illustrated in FIG. 6. It is contemplated that the vertical length of the open portion 26, i.e., from plate 28 to tow line 16, will be varied along the length of the floating boom 10 to accommodate the different forces and conditions that will be imposed by the tow line 16 along the length of the boom. In other words, as shown in FIG. 2A, at each end of the boom near the vessels the open portion 26 may be substantially shorter than near the center of the floating boom 10. By varying this dimension the desired angle or position of the skirt portion 25 may be maintained.

In operation the boom 10 is assembled from the plurality of curtain segments 14 and, as previously described, is towed by the vessels 11 and 12. It is preferred, although it may not be necessary under all conditions, that the vessels 11 and 12 be capable of independently varying the tensions imposed on the two lines 15 and 16 to continually maintain the desired angle of attack of the skirt 25 as the boom is moved through the water. It is contemplated that the primary towing force will be applied through the lower tow line 16 whereby the curtain 21 will be maintained at an inclined angle of attack while moving through the water with the lower extremity at tow line 16 always in advance of the floating member 20. The precise angle of attack may vary along the length of the boom and due to the water conditions involved. As the floating boom 10 is towed through the water the floating material or elements 13 to be collected accumulate in front of the floating member 20 and skirt 25 and the excess water flows through the open portion 26 of the curtain 21. This produces somewhat of a "sail" effect allowing the boom 10 to be towed through the water at a relatively rapid rate. The position of the impervious skirt 25 remains relatively stable and completely supported by the highly buoyant float member 20 while the excess water trapped in front of the boom conveniently flows beneath the skirt. With the skirt 25 maintained at an angle of inclination by the lower tow line 16 the floating elements or material will not have a tendency to proceed downwardly along the skirt and thereunder but rather will be forced toward the water surface. Since floating member 20 is highly buoyant and of substantial size, perhaps three feet in diameter, the floating material will not pass over the member 20 even in choppy or wavy water conditions and the member 20 cannot sink to a depth to allow spillage over the top. Thus with the apparatus of this invention the dynamic forces involved in towing a floating boom do not adversely affect the collection but rather the floating member 20 maintains the integrity of the surface barrier along the boom and the inclined attitude of attack of the skirt, as caused by lower tow line 16, prevents the collected material from flowing beneath the boom as the excess water passes thereunder.

FIG. 7 illustrates a modified form of this invention in which the floating boom 40 employs a curtain 41 of sheet material that extends the full distance between the upper floating member 42 and the lower tow line 43 which curtain may either be a single sheet or a double sheet as illustrated in FIG. 7. Openings 44 are formed in sheet 41, comparable to the open portion 26 of curtain 21 to allow the excess water to flow through the curtain sheet 41 at the lower portion but above the lower tow line 43. In this manner the sail effect is retained for the purposes noted above. It is contemplated that the curtain sheet 41 of this embodiment would be of a substantially heavier or reinforced material than that which would be usable with the aforedescribed preferred form of construction. The floating member 42 may comprise any convenient means and again would include the upper cable or tow line.

FIGS. 8, 9 and 10 illustrate a modification that is adaptable to either form of construction of the floating boom of this invention and further the figures illustrate the effect of this modification. The floating member 50 and depending curtain 51 may be of any convenient form with an open portion 52 in the lower portion of the curtain and a lower tow line 53 therebelow. In addition this embodiment includes smaller floats 54 and 55 on either side of the curtain float member 50 with a sheet 56 connected between floats 54 and 55 and to float member 50. This surface sheet 56 minimizes the loss of the collected material over the top of float member 50 as in extremely rough water conditions. FIGS. 9 and 10 illustrate the manner in which the floats 54 and 55 will follow the water surface contour in response to wave motion and the like. For example FIG. 10 illustrates a condition which might occur upon inadvertent excessive tensioning of the lower cable 53 tending to pull the curtain 51 and central float member 50 downwardly in the water whereupon the floats 54 and 55 together with sheet 66 serve as a secondary barrier during this transient condition.

While specific embodiments of my floating boom invention have been described it is to be understood that my invention is not limited to the described details but rather is of the full scope of the appended claims.

I claim:

1. A floating boom comprising, a horizontally elongated and generally vertically extending floating curtain means having an upper extremity floating at the water surface and extending downwardly a substantial distance to a lower extremity, means for towing said curtain means laterally through the water from beyond the horizontal ends of said curtain means including at least one tow line connected along the lower extremity of said curtain means for towing said curtain means at an angle of attack with said lower extremity in advance of said upper extremity, said curtain means including an impervious upper skirt portion constrained to said angle of attack by said towing and having a lower edge positioned in advance of the rest of the skirt portion, said curtain means being bendable along its length in both the vertical and horizontal directions for assuming the contour of the water surface in response to wave action and currents, and said curtain means having a lower portion including spaced tension elements for connecting the tow line continuously along the lower extremity of the curtain means with such lower portion being relatively open for allowing subsurface water to pass freely therethrough.

2. The floating boom of claim 1 wherein said towing means includes a second tow line connected along the upper extremity of said curtain means.

3. The floating boom of claim 1 wherein the upper extremity of said curtain means includes an enlarged floating member of excessive buoyancy for extending a distance above the water surface.

4. The floating boom of claim 1 wherein said curtain means has a substantial vertical dimension with said open portion being a relatively large proportion of said dimension.

5. The floating boom of claim 4 wherein the said vertical dimension varies along the length of the boom from end-to-end to maintain the lower extremity of each portion of said curtain means in advance of said upper extremity.

6. The floating boom of claim 5 wherein the proportion of the open portion increases as the vertical dimension increases.

7. A floating boom adapted to be towed by its ends through water to be swept, comprising, a horizontally elongated and generally vertically extending floating curtain means having an elongated upper floating member at the water surface and an impervious portion extending downwardly therefrom and having a lower edge, said curtain means having spaced tension elements forming an open portion extending a substantial distance below said lower edge of the impervious portion to a lower extremity, means for towing said curtain means from beyond the horizontal ends thereof including at least one tow line connected continuously along the lower extremity of said curtain means by said spaced tension elements for towing said curtain means at an angle of attack with both said lower extremity and said lower edge in advance of said upper extremity of said impervious portion, said tension elements being of sufficiently close spacing to apply the towing force uniformly along the length of the curtain means, said curtain means being bendable along its length in both the vertical and horizontal directions for assuming the contour of the water surface in response to wave action and currents, and said curtain means being open between said lower edge and said lower extremity for allowing subsurface water to pass freely therethrough.

8. The floating boom of claim 7 wherein said floating member includes a buoyancy element comprising bubble pack sheet material.

9. The floating boom of claim 8 wherein said bubble pack sheet material is circumferentially wrapped about a horizontal axis to form a generally cylindrical floating member.

10. The floating boom of claim 7 wherein at least one additional elongated floating member is provided and extends parallel to and spaced from the first floating member, and an impervious sheet member extending between and connecting said floating members.

11. The floating boom of claim 10 wherein a said additional floating member is provided on each side of the first floating member.

12. A floating boom adapted to be towed by vessels to sweep floating elements from an area of water, comprising, an elongated flotation means being bendable vertically and horizontally for floating on the water and assuming the contour of the water surface in response to wave action and currents, a skirt means extending the length of and connected to said flotation means and adapted to extend downwardly into the water to a lowermost skirt edge, harness means extending below said skirt means, a tow line connected along the lower extremity of said harness means and having ends adapted to be towed by the vessels, said skirt means being impervious and serving as a barrier for collecting the floating elements in the water, and said harness means including a multiplicity of closely spaced tension elements extending upwardly from said tow line to structurally join said tow line continuously along said skirt means and flotation means assemblage for towing that assemblage evenly through the water and being relatively open for allowing water to pass freely therethrough as the boom is towed through the water by said tow line, said skirt means and harness means being flexible for accommodating such bending of the flotation means and allowing the skirt means and harness means to assume an angle of attack with the lower extremity in advance of said floatation means and said lowermost skirt edge in advance of the upper extremity of the skirt portion.

13. The floating boom of claim 12 wherein said harness means includes vertical straps comprising said tension elements extending from said tow line to said flotation means and along at least that side of said skirt means away from the direction of towing for supporting said skirt means.

14. The floating boom of claim 13 wherein the harness means is of varying length along the boom.

15. An elongated floating boom for sweeping floating elements from water be being towed through the water by each end, comprising, a plurality of floating curtain segments releasably connected side by side to provide the required length boom, each floating curtain segment having an elongated flotation member along the upper end for buoyantly supporting said segment, said plurality of flotation members being bendable relative to each other in the vertical and horizontal directions for assuming the contour of the water surface in response to wave action and currents, each said flotation member having a buoyancy for in excess of the weight of said curtain segment and extending above the water surface a substantial distance for preventing the floating elements from washing over said curtain segment, each curtain segment having an impervious skirt portion extending downwardly a substantial distance below said floatation member to a lowermost edge, each curtain segment having a relatively open portion comprising a multiplicity of closely spaced tension elements extending downwardly from said lowermost edge of the skirt portion, a tow line means connected continuously along the curtain segments at the lower extremity of said open portion to said tension elements and connecting said plurality of floating curtain segments together for towing the boom through the water with the curtain segments inclined at an angle of attack with the lower extremity in advance of said flotation member and forcing the skirt portion to a like angle of attack with said lowermost edge in advance of skirt upper extremity, and said impervious skirt and open portion of said curtain segment being flexible for allowing such bending of the flotation members and assuming said angle of attack.

16. The floating boom of claim 15 wherein said elongated flotation member includes a cover member filled with bubble pack sheet material.

17. A floating boom adapted to be towed by its ends through water to be swept, comprising, a horizontally elongated and generally vertically extending floating curtain means having an elongated upper floating member at the water surface and an impervious portion extending downwards, therefrom, said curtain means extending a substantial distance below said impervious portion to a lower extremity, said upper floating member including a central tube and bubble pack sheet material circumferentially wrapped about said tube to provide buoyancy, means for towing said curtain means from the horizontal ends thereof including one tow line extending through said tube and another tow line connected along the lower extremity of said curtain means for towing said lower extremity in advance of said upper extremity, and said curtain means being relatively open near said lower extremity for allowing subsurface water to pass therethrough.

18. An elongated floating boom for sweeping floating elements from water by being towed through the water by each end, comprising, a plurality of floating curtain segments releasably connected side by side to provide the required length boom, each floating curtain segment having an elongated floatation member along the upper end for buoyantly supporting said segment, said flotation member including a central tube with a multiplicity of layers of bubble pack sheet material wrapped about said tube and an encircling cover about said sheet material, said flotation member having a buoyancy far in excess of the weight of said curtain segment and extending above the water surface a substantial distance for preventing the floating elements from washing over said curtain segment, each curtain segment having an impervious skirt portion extending downwardly a substantial distance below said flotation member, each curtain segment having a relatively open portion extending downwardly from said skirt portion, one tow line extending through said tube and another tow line connected along the lower extremity of said open portion and connecting said plurality of floating curtain segments for towing the boom through the water.

19. The floating boom of claim 18 wherein said open portion of said curtain segment is comprised of vertical straps extending around said flotation member and downwardly along and beyond the skirt portion for connection to said tow line.

20. A method for rapidly collecting floating material in rough water by using an elongated and bendable floating boom having a depending curtain with an impervious portion terminating in a lowermost edge and an open structural portion extending therebelow, comprising the steps of connecting a bottom tow line continuously along the entire length of the curtain at the lower extremity thereof to the open structural portion, towing the boom through the water primarily with the bottom tow line by portions of the tow line extending substantially beyond each end of the boom to cause the depending curtain to progress through the water in a relatively uniform curved arc between the ends and at an angle of attack with the lower extremity in advance of the said lowermost edge which is in turn in advance of the upper extremity of the curtain to collect the floating material in front of the impervious portion of the curtain and allow the free flow of subsurface water through the open portion between said lowermost edge and the bottom tow line.

* * * * *